United States Patent
Isaac et al.

(10) Patent No.: US 9,137,949 B2
(45) Date of Patent: Sep. 22, 2015

(54) CHOPPER ASSEMBLY FOR HARVESTING EQUIPMENT

(71) Applicant: CNH America LLC, New Holland, PA (US)

(72) Inventors: Nathan E. Isaac, Lancaster, PA (US); Andrew V. Lauwers, Stevens, PA (US); Mark D. Dilts, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 120 days.

(21) Appl. No.: 13/726,717

(22) Filed: Dec. 26, 2012

(65) Prior Publication Data

US 2014/0179383 A1    Jun. 26, 2014

(51) Int. Cl.
*A01F 12/40* (2006.01)

(52) U.S. Cl.
CPC ...................................... *A01F 12/40* (2013.01)

(58) Field of Classification Search
CPC .............. A01F 12/40; A01F 2014/104; A01F 2015/108; A01F 29/00; A01F 29/02; A01F 29/08; A01F 29/095; A01F 29/16; A01D 90/04; A01D 41/1243
USPC ........... 460/112, 109, 111; 56/14.6; 241/88.4, 241/32, 282.2, 285.2
See application file for complete search history.

(56) References Cited

U.S. PATENT DOCUMENTS

| | | | |
|---|---|---|---|
| 2,670,775 A * | 3/1954 | Elofson | 241/187 |
| 3,005,637 A * | 10/1961 | Hetteen | 241/240 |
| 3,350,017 A | 10/1967 | Howell et al. | |
| 3,815,823 A | 6/1974 | Johnson | |
| 3,874,604 A * | 4/1975 | Gronberg et al. | 241/243 |
| 4,342,319 A * | 8/1982 | Willis et al. | 460/66 |
| 4,612,941 A * | 9/1986 | Kunde | 460/112 |
| 5,368,238 A * | 11/1994 | Bergkamp et al. | 241/30 |
| 5,503,339 A * | 4/1996 | Doppstadt | 241/166 |
| 5,542,883 A * | 8/1996 | Cruson | 460/112 |
| 5,556,042 A * | 9/1996 | Roberg | 241/101.76 |
| 5,928,079 A * | 7/1999 | Roberg | 460/83 |
| 5,928,080 A | 7/1999 | Jakobi | |
| 5,974,776 A | 11/1999 | Prellwitz | |
| 6,152,820 A * | 11/2000 | Heidjann et al. | 460/112 |
| 6,251,009 B1 * | 6/2001 | Grywacheski et al. | 460/112 |
| 6,370,851 B1 | 4/2002 | Uros et al. | |

(Continued)

FOREIGN PATENT DOCUMENTS

DE    8130492 U1    5/1984
EP    1852011    4/2007

*Primary Examiner* — Árpápad Fábián-Kovács
(74) *Attorney, Agent, or Firm* — Patrick M. Sheldrake; Seyed V. Sharifi T.

(57) ABSTRACT

A chopper assembly for harvesting equipment including a knife bank movable between a first position where knife elements of the knife bank are fully inserted into a passageway for crop residue and a second position where knife elements of the knife bank are fully retracted from the passageway. A body has a slot or profile, the body secured to the knife bank and at least one knife element, the body and the knife element configured to move relative to the knife bank. A resilient device operably connects the slot or profile and the knife bank, the resilient device preventing movement of the knife element away from the first position and toward the second position until the knife element is subjected to a predetermined force. Upon removal of the predetermined force, the resilient device urges the knife element to move toward the first position.

18 Claims, 13 Drawing Sheets

(56) References Cited

U.S. PATENT DOCUMENTS

| | | | |
|---|---|---|---|
| 6,594,983 B1 * | 7/2003 | Krone et al. | 56/341 |
| 6,595,123 B2 * | 7/2003 | Schrag et al. | 100/97 |
| 6,699,121 B2 * | 3/2004 | Bognar et al. | 460/112 |
| 6,783,453 B2 | 8/2004 | Bueermann et al. | |
| 6,912,835 B1 | 7/2005 | Chabassier | |
| 7,252,587 B2 | 8/2007 | Viaud | |
| 7,510,472 B1 | 3/2009 | Farley et al. | |
| 7,553,225 B2 | 6/2009 | Benes | |
| 7,867,072 B2 * | 1/2011 | Lauwers et al. | 460/112 |
| 7,988,080 B2 | 8/2011 | Benes et al. | |
| 7,993,187 B2 | 8/2011 | Ricketts et al. | |
| 8,006,926 B2 | 8/2011 | Benes et al. | |
| 8,092,286 B2 | 1/2012 | Farley et al. | |
| 2008/0290198 A1 * | 11/2008 | Benes et al. | 241/88.4 |
| 2008/0293461 A1 * | 11/2008 | Benes et al. | 460/112 |

* cited by examiner

CHOPPER ASSEMBLY FOR HARVESTING EQUIPMENT

BACKGROUND

The present application relates generally to a chopper assembly for a combine. The present application relates more specifically to an apparatus for re-setting chopper elements of a counter knife bank in a chopper assembly to an operating position after striking a foreign object in the operating position.

Harvesting equipment, such as agricultural combines, can use chopper assemblies, such as integral chopper assemblies or hood mounted chopper assemblies or systems to transport material away from the threshing system and to also treat the material, e.g., by further cutting the material, as it is being transported away from the threshing system. A rotary chopper element or portion of the integral chopper system can be operated at or near 3,000 revolutions per minute (RPM) to transport the material from the threshing system to a spreading system. When operated at 3,000 RPM, the material is transported with the shortest mean length of cut to permit modern minimum tillage applications. In a less common embodiment, the integral chopper system can be operated at a speed of about 800 RPM to more gently transport the material from the threshing system to a spreading system and with considerably less chopping activity. When operated at 800 RPM, the material can be transported to the spreading system with the longest length and least amount of damage.

Integral chopper systems can have a residue chopper assembly that has a rotary chopper component or element disposed laterally within a housing extending generally horizontally across the flow path of the crop residue through the housing, as well as a counter knife assembly extending generally parallel to and spaced from the rotary chopper element. The counter knife assembly has included a chopper grate assembly spaced below and extending generally parallel to the rotary chopper element and a knife mounting assembly positioned generally beneath the chopper grate assembly.

Often, the counter knife assembly can have an adjustment mechanism that is operable to vary the spacing between a grate portion of the chopper grate assembly and the knife mounting assembly, as well as the degree of projection of the blade elements of the knife mounting assembly through the slots of the grate portion. The adjustment mechanism can be operated to move the knife mounting assembly between a fully engaged or inserted position with the blade elements of the knife mounting assembly extending through the slots towards the rotary chopper element and a fully retracted position in which the blade elements are fully withdrawn or retracted from the slots. In addition, the adjustment mechanism can move the blade elements to various positions between a fully engaged position and a fully retracted position.

When the knife mounting assembly is in an engaged position, either fully or partially, the crop residue can be chopped into smaller pieces by the cooperative actions of the knife blades or elements of the knife mounting assembly and the knife blades or paddles on the rotating rotary chopper element as the crop residue is moved and propelled rearward. The knife mounting assembly is usually positioned into an engaged position, either fully or partially, when the rotary chopper element is operated at or near 3,000 RPM and is usually positioned in a fully retracted position when the rotary chopper element is operated at 800 RPM to avoid excessive power requirements for the combine.

To avoid breakage of knives due to striking foreign objects ingested during harvesting, counter knife elements may be configured to deflect or break-away from respective operating positions to a non-working position. However, such configurations may require manual re-setting of the knife elements, which is undesirable.

In response, U.S. Pat. No. 5,928,080 utilizes a spring that permits cutting knives to be returned to an operating position upon being subjected to a foreign object, causing temporary angular deflection of the knives. However, such a spring could permit the knives to be angularly deflected to non-working position in response to an increase in working load. That is, the knives could be inadvertently moved to the non-working position during normal harvesting operating loads.

Therefore, what is needed is an apparatus usable with standard reversible, dual edged knives that requires an elevated amount of force greater than that associated with normal harvesting operations to angularly deflect the knives from an operating position, and then returning the knives to the operating position when the force is reduced.

SUMMARY

The present application relates to a chopper assembly for harvesting equipment including a rotary chopper element. A chopper grate assembly is spaced from the rotary chopper element to form a passageway for crop residue. A knife bank is operably connected to the chopper grate assembly. The knife bank is movable between a first position where knife elements of the knife bank are fully inserted into the passageway and a second position where knife elements of the knife bank are fully retracted from the passageway. A body has a slot formed therein or profile formed thereupon. The body is secured to the knife bank and at least one knife element, the body and the knife element configured to move relative to the knife bank. A resilient device is operably connected to the slot or profile and the knife bank. The resilient device prevents movement of the knife element away from the first position and toward the second position until the knife element is subjected to a predetermined force. Upon removal of the predetermined force, the resilient device urges the knife element to move toward the first position.

The present application further relates to a chopper assembly for harvesting equipment includes a rotary chopper element, and a chopper grate assembly spaced from the rotary chopper element to form a passageway for crop residue. A knife bank is operably connected to the chopper grate assembly. The knife bank is movable between a first position where knife elements of the knife bank are fully inserted into the passageway and a second position where knife elements of the knife bank are fully retracted from the passageway. A body has a slot formed therein or profile formed thereupon. The body is secured to the knife bank and at least one knife element, the body and the knife element configured to rotate about an axis relative to the knife bank. The slot or profile includes a first portion extending to a second portion having a first end proximate to the first portion and a second end distal to the first portion. The first portion subtends an acute angle between an axis of the resilient device when the resilient device is in the first position. The first end of the second portion is positioned at a first distance from the rotational axis of the knife. The second end of the second portion is positioned at a second distance from the rotational axis of the knife. Upon proceeding along the slot or profile from the first end of the second portion toward the second end of the second portion, a deviation from the first distance increases. A resilient device is operably connected to the slot or profile and the knife bank. The resilient device prevents rotation of the knife element about the axis away from the first position and toward the second position until the knife element is subjected to a predetermined force. Upon removal of the predetermined force, the resilient device urges the knife element to rotate about the axis toward the first position. An actuating mechanism moves knife elements of the knife bank between the first position and the second position independent of the resilient device and the body.

One advantage of the present application is an apparatus permitting use of standard, dual edge knives, while helping to protect the knives from sudden overload conditions.

Another advantage of the present application is that once the sudden overload conditions are no longer applied, the knives are returned to an operating position.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE
EXEMPLARY EMBODIMENTS

Figure 1:
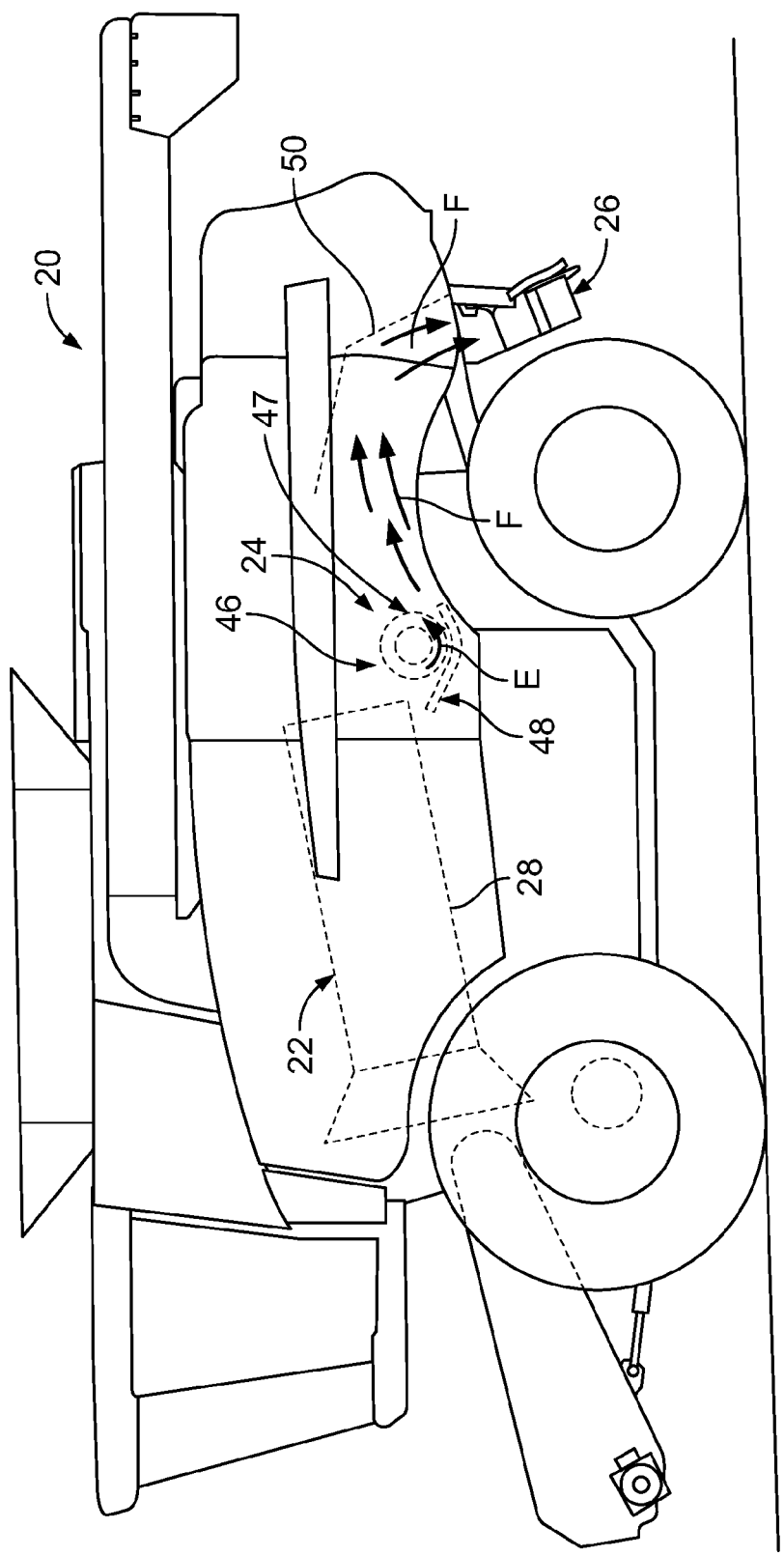
FIG. 1 shows a simplified side view, from the left side, of an agricultural combine.
Figure 2:
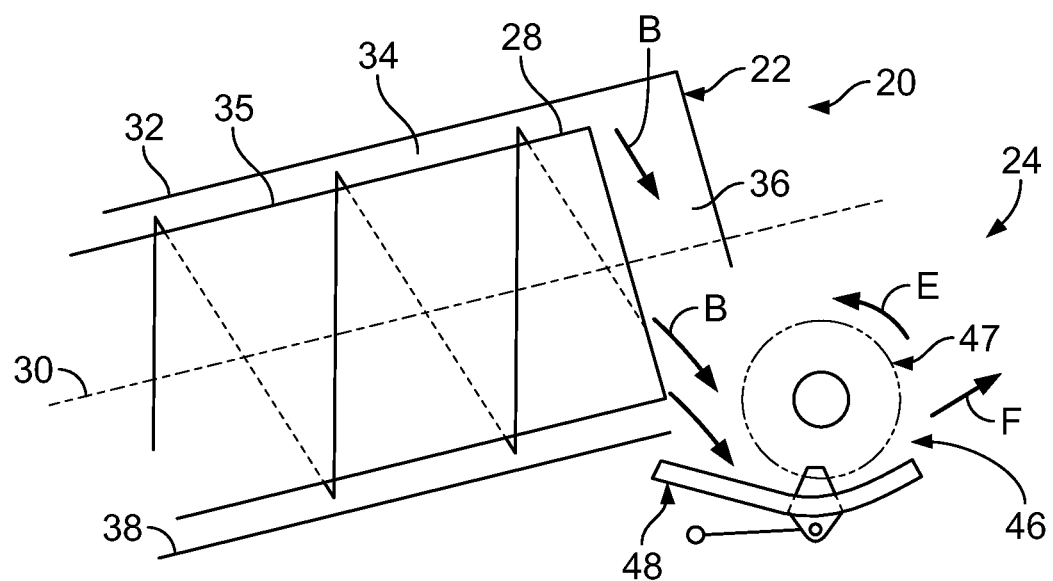
FIG. 2 shows a simplified side view, from the left side, of the threshing system and a portion of the crop residue treatment and distribution system of the combine of FIG. 1.

FIGS. 1 and 2 depict an exemplary agricultural combine 20 that can include a longitudinally axially arranged threshing system 22 and a crop residue treatment and distribution system 24 with a crop residue spreader 26. Threshing system 22 can include a cylindrical threshing rotor 28 within a rotor housing 32. The rotor 28 can be conventionally supported and rotatable in a predetermined direction, e.g., clockwise, about a rotational axis 30. The rotor 28 can convey a flow of crop material in a helical flow path through a space 34 extending circumferentially around an outer cylindrical surface 35 of rotor 28 and an inner circumferential surface 38 of rotor housing 32. As the crop material is moved through space 34, the crop, such as grain, legumes, or the like, can be loosened and separated from crop residue, such as husk and pods, and carried away in a conventional manner.

The crop residue can continue along the helical path through space 34, and is then expelled, as denoted by arrows B, into and through a discharge opening and passage 36, which can be an extension of space 34 at the downstream end of threshing rotor 28. The consistency of the flow of crop residue, volume thereof, and extent or pattern thereof, can vary, and may be a function of a variety of conditions, including, but not limited to, the speed of rotation of rotor 28, crop type, plant maturity, moisture content, and weather conditions. As an example, speeds for rotor 28 can vary between just a few hundred RPM to over 1,000 RPM. Wheat and other small grains can have relatively small crop residue components, whereas other grains, such as corn, can have larger components, such as thick stalk segments, cob fragments, and large leaves.

Crop residue treatment and distribution system 24 can include a transport and chopping assembly, such as integral chopper assembly 46 configured about an aft portion of the combine 20, sometimes hereinafter referred to as rotary assembly 46, having a rotary chopper element 47 rotatable in a direction E above a concave pan assembly such as chopper grate assembly 48. The chopper assembly 46 is operatively connected downstream of the threshing system 22 to receive the flow of crop material from the threshing system 22. Rotary chopper element 47 can rotate at a rapid speed, so as to be capable of accelerating and propelling a flow of crop residue rearward within the confines of the rear end of combine 20, as generally denoted by arrows F. Such rearward flow can be guided and directed by internal panels or shields, generally denoted by shields 50, to flow through a rear opening so as to be deposited directly onto a field, such as in a windrow, or to flow into a secondary crop residue chopper and/or spreader 26 for spreading in a swath on the field.

Figure 3:
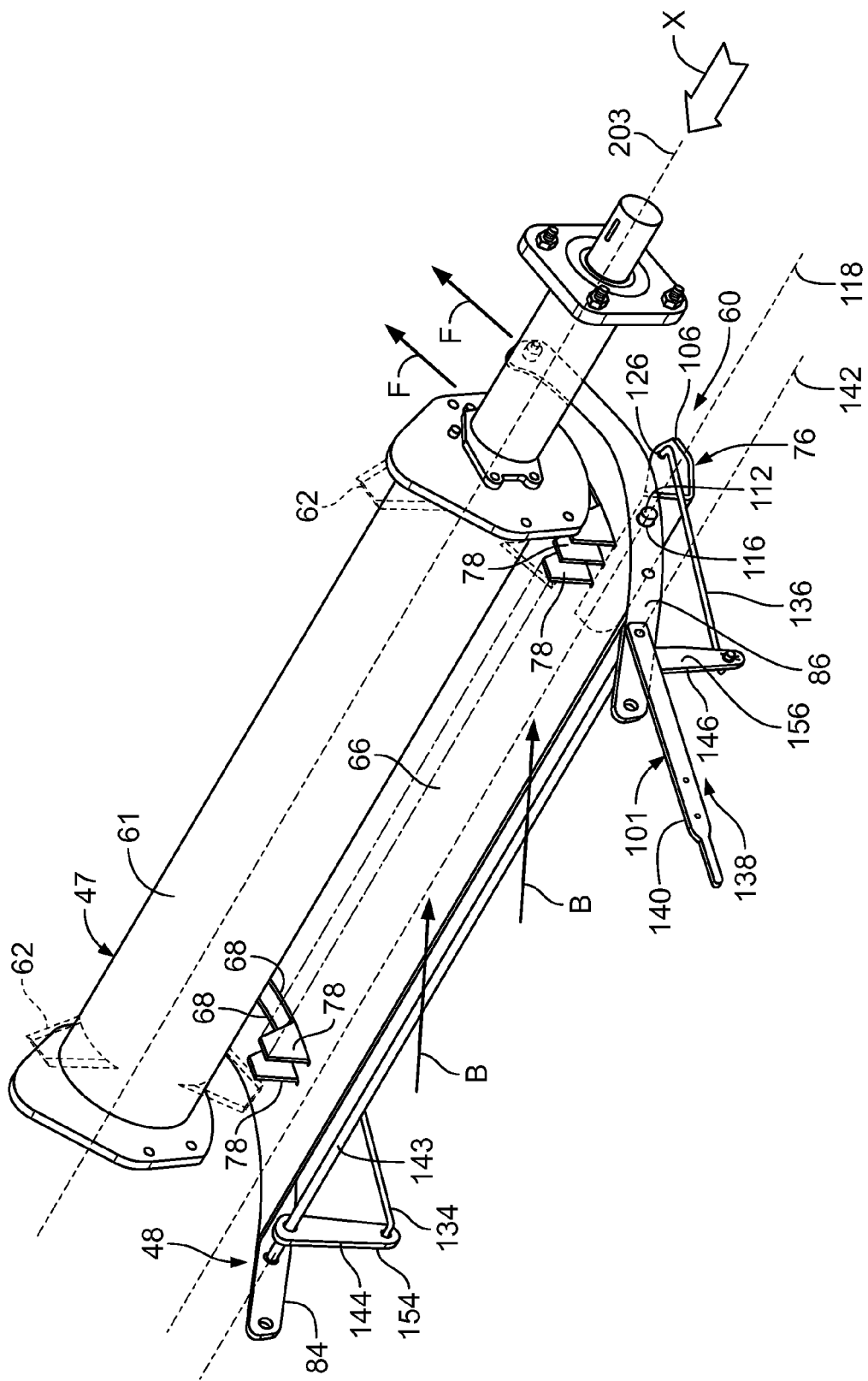
FIG. 3 shows an upper perspective view, from the left front side, of an integral chopper assembly, showing an exemplary embodiment of a counter knife assembly.
Figure 4:
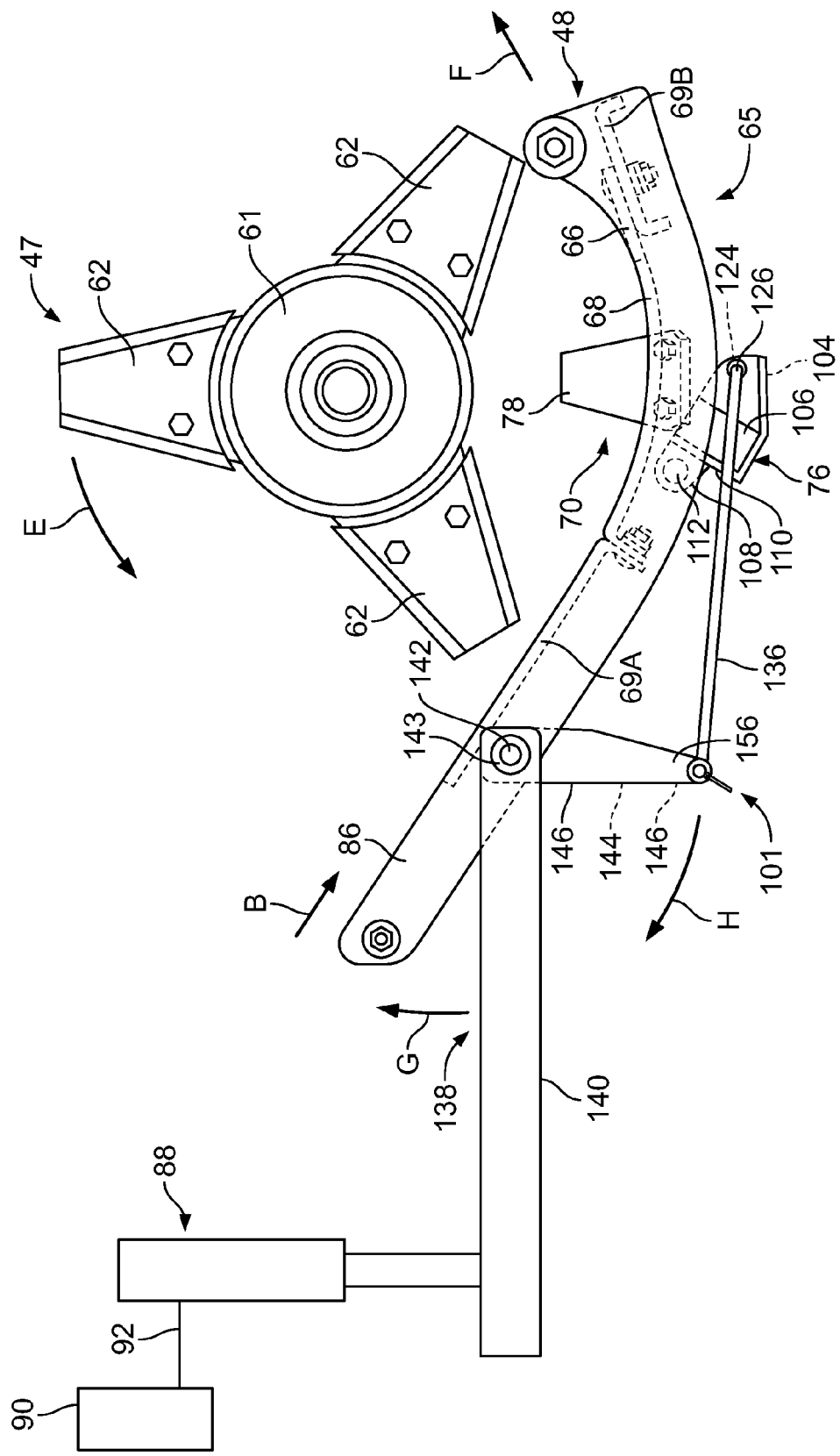
FIG. 4 shows a simplified left side view, generally viewed from position X in FIG. 3, of a portion of the integral chopper assembly of FIG. 3.

FIGS. 3-4 depict a portion of an integral chopper assembly 46 that includes not only a concave pan portion that employs a replaceable grate portion and an interruption plate downstream from the slots in the grate portion of the chopper grate assembly 48, but also a rotary chopper portion or element 47 that extends generally horizontally across the flow path of the crop residue above the chopper grate assembly 48. The chopper grate assembly 48 can include a counter knife assembly 60. The rotary chopper element 47 can include a cylindrical element or rotary member 61, and has a number of paddles or knife blades 62 mounted or affixed thereto at a plurality of mounting locations distributed about the periphery. The particular positioning, arrangement, and configuration of the paddles or knife blades 62 can be determined based on particular requirements to be satisfied.

Figure 5:
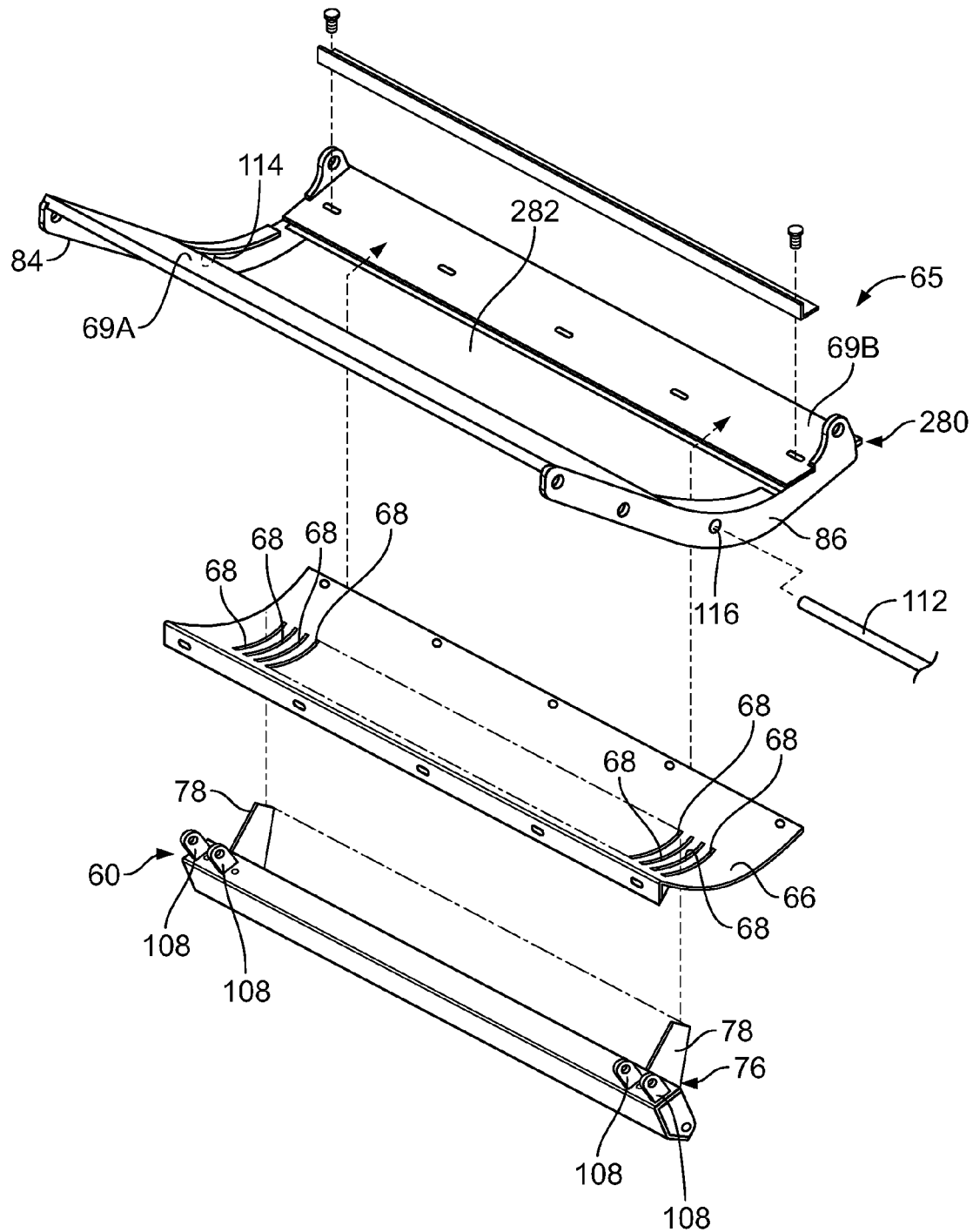
FIG. 5 shows an exploded perspective view of various portions of the concave pan portion of the integral chopper assembly of FIGS. 3 and 4.

FIG. 5 depicts in an exploded view various components of the chopper grate assembly 48 of the integral chopper assembly 46, including a generally concave pan portion 65, sometimes hereinafter also referred to as a concave pan assembly. The concave pan portion 65 includes a grate portion 66 positioned between leading and trailing plate portions 69A and 69B that extends generally parallel to the rotary chopper element 47 with a plurality of spaced slots 68. Applicant's U.S. Pat. No. 7,553,225 further discloses details of such operation, which is incorporated by reference in its entirety.

In FIG. 4, rotary chopper element 47 and grate portion 66 of concave pan portion 65 of chopper grate assembly 48 define a passageway 70 therebetween for the crop residue flow that is directed to the integral chopper assembly 46 for treatment thereby, such as crop residue flow B from the threshing system 22 (see FIG. 2). The slots 68 in grate portion 66 are generally elongated and extend along the grate portion 66 generally in the direction of the crop residue flow B.

Referring to FIGS. 3-5, the counter knife assembly 60 includes a stationary counter knife bank assembly or counter knife bank or knife bank 76 having a plurality of spaced blades or knife elements 78 positioned generally beneath and parallel to both rotary chopper element 47 and grate portion 66. The knife elements 78 are mounted at positions along knife bank 76 that correspond to slots 68 in grate portion 66. The slots 68 in grate portion 66 can be sized and configured to permit the blades or knife elements 78, when moved, to project through slots 68.

As may be observed from FIG. 5, in an exemplary construction of integral chopper assembly 46, grate portion 66 is provided as a separate element that can be easily mated, with leading and trailing plate portions 69A, 69B of concave pan portion 65, as a consequence of which grate portion 66 can be easily removed if and when it becomes undesirably worn and replaced with a like element. As may be further observed from FIG. 5, concave pan portion 65 includes a shell portion 280 that includes the leading and trailing plate portions 69A, 69B installed between opposed concave pan side walls or plates 84, 86, with an intermediate opening 282 between the leading and trailing plate portions 69A, 69B, into which intermediate opening 282 grate portion 66 may be inserted and installed.

Figure 6:
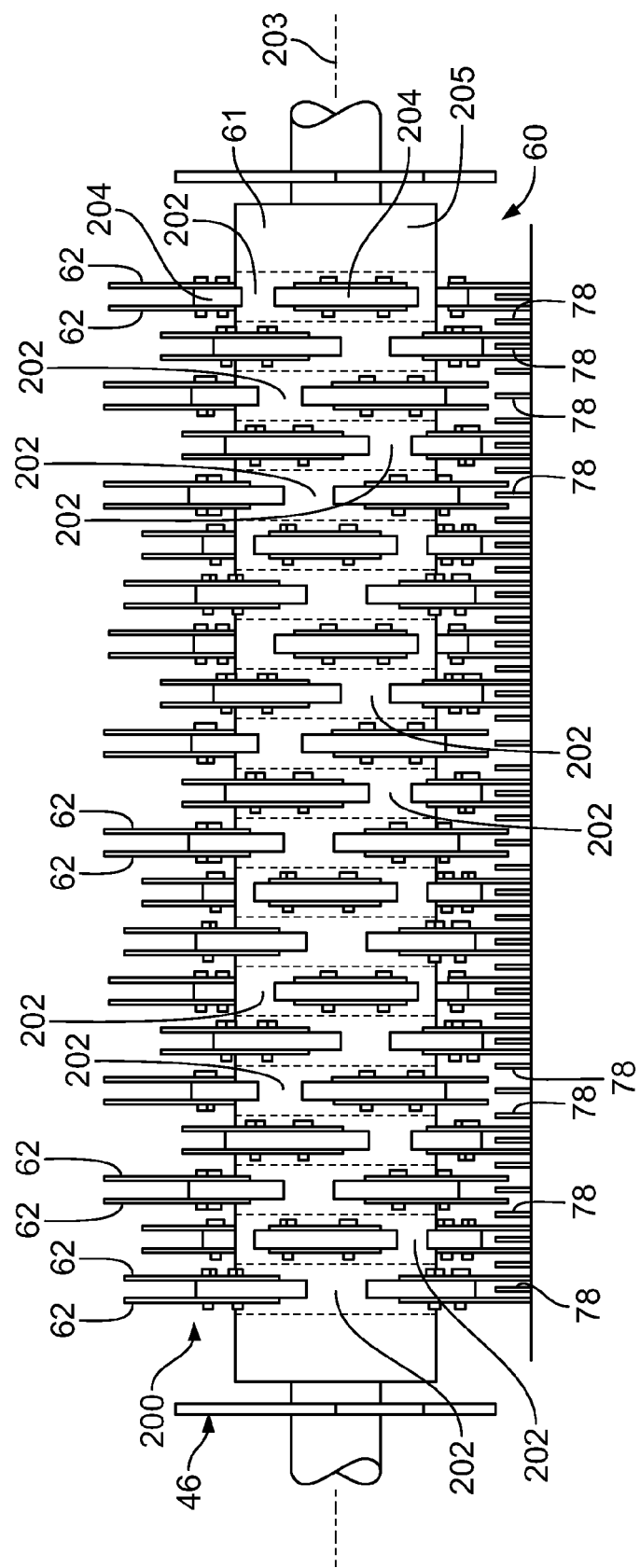
FIG. 6 shows a plan view looking forwardly from the rear of the integral chopper assembly towards the rotary chopper element.
Figure 7:
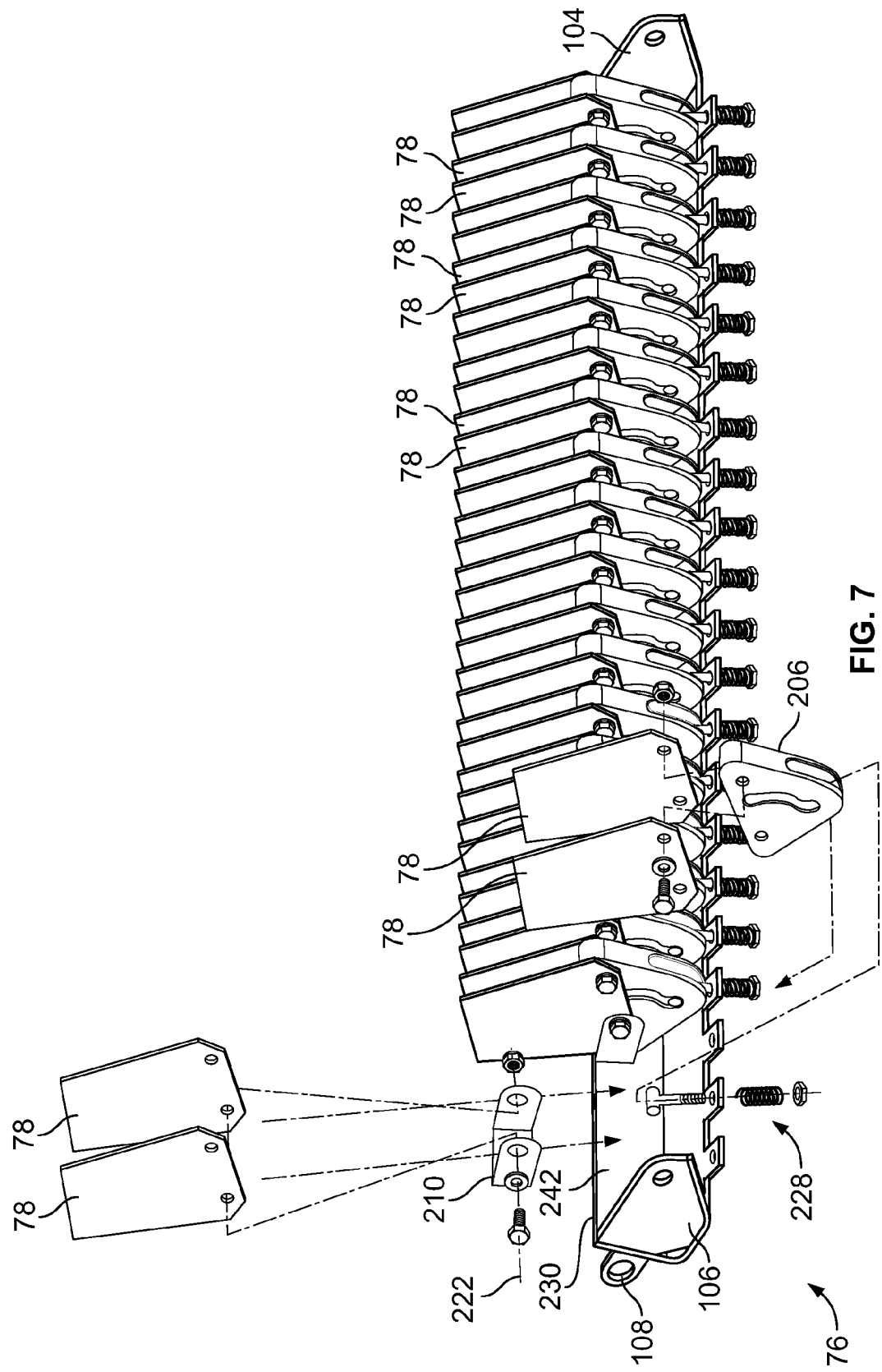
FIG. 7 shows a perspective view of an exemplary knife bank assembly.

Slots 68 and knife elements 78 are appropriately positioned relative to knife blades 62 of rotary chopper element 47 to permit the knife elements 78 and knife blades 62 to be interengagable with one another, so as to pass adjacent to one another without contacting one another. An exemplary embodiment of the interengagable movement of the knife elements 78 and knife blades 62 is illustrated in FIG. 6, which depicts the rotary element 47 and top portions of the knife elements 78 of the counter knife assembly 60 when the knife elements 78 project through slots 68 of the grate portion 66 into the flow passageway 70. The knife blades 62 and knife elements 78 are so mounted that they are interengagable with one another during a chopping operation without contacting or interfering with one another.

The integral chopper assembly 46 can include an adjustment mechanism 101 for adjustably varying the positioning of the knife bank assembly 76 relative to the grate portion 66 of the chopper grate assembly 48 between a fully engaged position wherein the knife elements 78 of the knife bank assembly 76 extend through the slots 68 of the grate portion 66 of the chopper grate assembly 48 at a maximum projection and a partially or fully retracted position wherein the knife elements 78 project minimally, if at all, through the slots 68. The knife bank 76, which extends between first and second knife bank end plates 104 and 106, is generally spaced from and parallel to both rotary chopper element 47 and grate portion 66 and extends between opposed side wall or side plates or plates 84, 86 of the concave pan portion 65.

The counter knife bank 76, which is dimensioned to extend generally the width of the grate portion 66 between knife bank end plates 104 and 106, includes spaced mounting eyelets 108 along a side 110. A shaft member 112 extends through mounting eyelets 108 to end connections 114 and 116 on the respective opposed side plates 84 and 86 of concave pan portion 65.

The shaft member 112, when so mounted through the end connections 114, 116, defines an engagement positioning axis 118 (see FIG. 3), sometimes hereinafter also referred to as swivel axis 118, about which knife bank 76 can be rotated or pivoted in an arc-like movement.

Knife bank end plates 104, 106 also include lower portions 124, 126, which are operatively connected via respective positioning rods 134, 136 to a lever assembly 138. The lever assembly 138 can be operable to effect, through the coupled movement of positioning rods 134, 136, a rotation or pivoting of knife bank end plates 104, 106 and the knife bank 76 about swivel axis 118. The rotation or pivoting of the knife bank can be used to extend or retract the knife elements 78 into or from the flow passageway 70. Lever assembly 138 includes an operable lever 140 coupled at axis 142 to a rotatable connecting rod 143 that extends between side plates or walls 84, 86 of concave pan portion 65. The connecting rod 143 can be attached to support links 144 and 146. Support links 144, 146 are respectively connected to positioning rods 134, 136.

When lever 140 is operated, as denoted by arrow G in FIG. 4, support links 144, 146 are caused to rotate thereby effecting rotational movement of end portions 154, 156 of support links 144, 146 about axis 142, as denoted by arrow H in FIG. 4, consequent movement of positioning rods 134 and 136, and the resultant rotational movement of the knife bank assembly 76, including knife bank end plates 104 and 106, about swivel axis 118. By thus operating, and then fixing the status of lever assembly 138 at a given position, a user can conveniently alter and fix the positioning of the knife bank 76 relative to grate portion 66, thereby controlling to some extent the amount by which the knife elements 78 are permitted to project through slots 68.

The ability to effect a repositioning of the knife bank 76 relative to grate portion 66 is beneficial in circumstances where a user finds it desirable to be able to withdraw or retract the knife elements 78 of the counter knife assembly 60 from the flow passage or passageway 70, such as to clear obstructions/foreign objects as well as in circumstances where the user wishes to adjust the quality of the chop. Typically, the greater the amount of projection, the finer the chop, and the less the amount of projection, the coarser the chop.

It will be understood and appreciated by those skilled in the art that, although the position of knife bank 76 in the embodiment of FIGS. 3-4 is shown controlled by the operation of a lever assembly 138 and associated linkages, various other mechanisms and devices could equally as well be utilized to control the positioning of positioning rods 134, 136 or, more directly, the swivel positioning of knife bank end plates 104, 106, or even the placement of knife bank 76 closer or farther from grate portion 66. Such mechanisms and devices may be manually or automatically operable, including remotely by a user, such as from the cab of a combine, and may include various and sundry systems and components of well known construction for effecting the desired movements, placements, or positioning.

For example, as shown in FIG. 4, an actuating mechanism such as a solenoid 88 can be operatively connected to the lever assembly 138. The solenoid 88 is connected to the lever 140. The solenoid 88 can be, for example, a New Holland solenoid model 681,923, which is a push type solenoid. The solenoid 88 receives a signal i.e., an input, from a controller 90 such as through solenoid wires 92. In one embodiment, the signal between solenoid 88 and controller 90 may be conveyed via a wireless arrangement. Alternatively, the lever can be adjusted by other actuating mechanisms such as an electrical and/or mechanical actuator, hydraulic cylinder, a linear actuator, an pneumatic actuator, a motor or the like.

In another embodiment, the solenoid 88 can be connected to the knife bank 76 anywhere along its structure so as to move the knife bank 76 from a fully engaged position to at least a partially retracted position. That is, the solenoid 88 can move the knife bank 76 between a first position (e.g., the knife bank 76 is fully retracted from the chopper grate assembly 48) and a second position (e.g., the knife bank 76 is fully engaged with the chopper grate assembly 48).

FIG. 6 shows one exemplary knife blade arrangement 200 in which a plurality, such as twenty-one (21) generally like ring portions 202 are axially stacked side-by-side along the longitudinal axis 203 of rotary member 61. Mounts or mounting lugs 204, sometimes hereinafter referred to as lugs, are affixed, such as by welding, to the outer periphery 205 of rotary member 61 at spaced annular intervals that are generally equal to one another.

From previous discussions hereinabove, it should be appreciated that, when the counter knife assembly 60 is in an engaged position, with the knife elements 78 thereof projecting between slots 68 of the grate portion 66 of chopper grate assembly 48, with rotary member 61 being rotated at about 3,000 RPM, the knife blades 62 on the rotary member 61 can serve to transport residue rapidly towards the rear of combine 10 and, while doing so, can also interact with the knife elements 78 of the counter knife assembly 60 to chop or cut the residue into smaller pieces. Alternatively, especially if the counter knife assembly 60 is positioned in its retracted position, with the knife elements 78 being retracted within slots 68 of the grate portion 66 of chopper grate assembly 48, with rotary member 61 being rotated at a lesser rate of about 800 RPM, the knife blades 62 on the rotary member 61 can serve to transport residue contacted thereby towards the rear of combine 20, but more slowly and with less damage to the crop residue, as a consequence of which longer and larger pieces of residue will be transported rearward in combine 20.

FIGS. 7-12 depict counter knife assemblies, and components thereof, that may be employed as the counter knife assembly 60 of FIGS. 3-4 in such a way as to better illustrate the manner in which the knife elements 78 are resiliently mounted or connected to knife bank 76. In the exemplary embodiments depicted in FIGS. 7-12, knife bank 76, which can be dimensioned to extend between knife bank end plates 104 and 106 and the width of the grate portion 66 (FIGS. 3 and 4), includes a knife bar 230 positioned between knife bank end plates 104 and 106, with a plurality of blade holders or holders or bodies 206 spaced therein and therealong, to each of which body 206 at least one knife element 78 may be attached. In one exemplary embodiment as better shown in FIGS. 8 and 9, each holder or body 206 can be capable of having two spaced, knife elements 78 mounted thereto in a side-to-side arrangement, which knife elements 78 may be of conventional designs and include spaced mounting holes 234, 235 near the bases 236. In one embodiment, the body can be configured to hold more than two spaced, knife elements 78 mounted thereto in a side-to-side arrangement. In one embodiment, the body can be configured to hold all of the knife elements of the knife bank.

Figure 8:
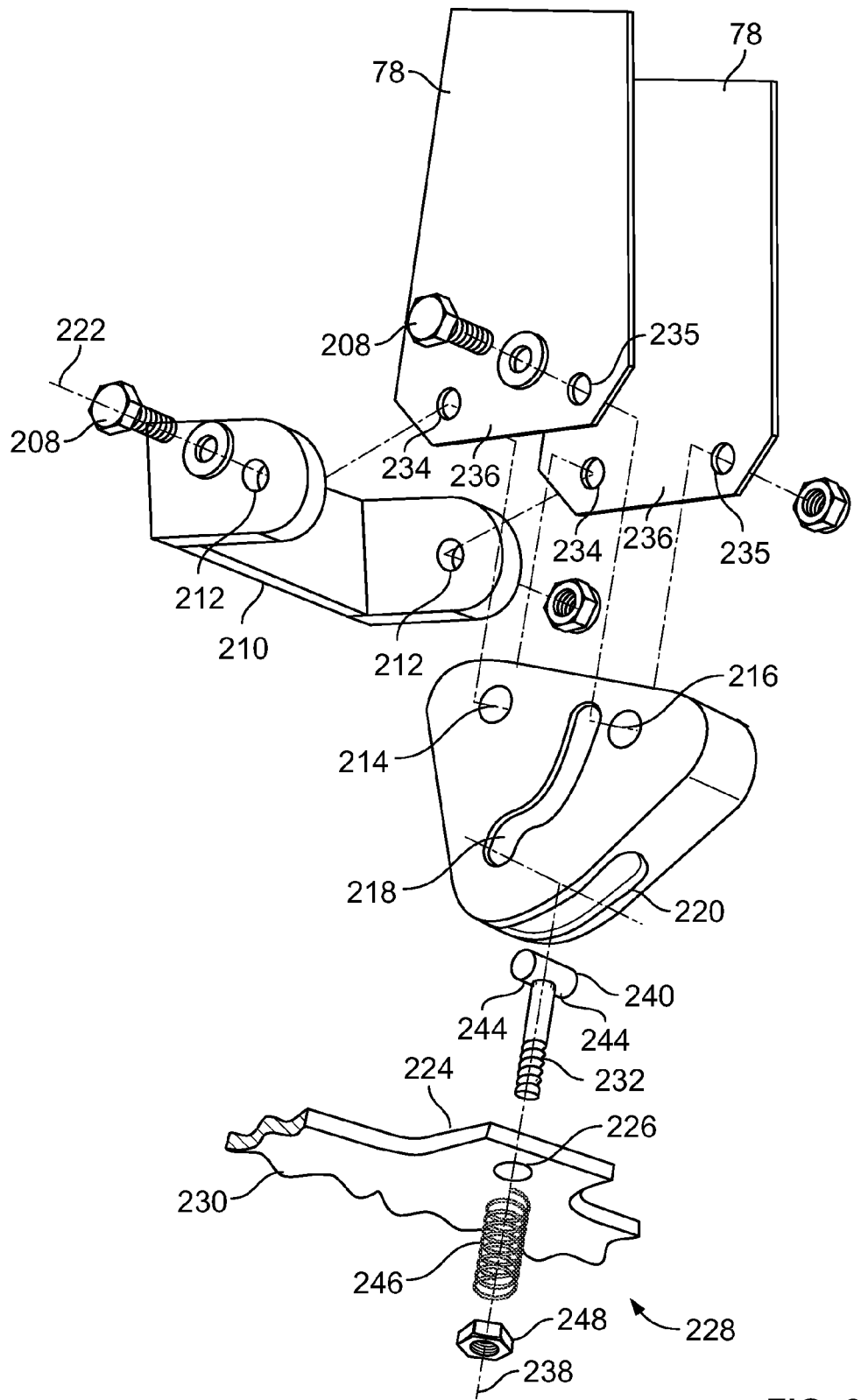
FIG. 8 shows an enlarged perspective view of a portion of the knife bank assembly of FIG. 7.
Figure 9:
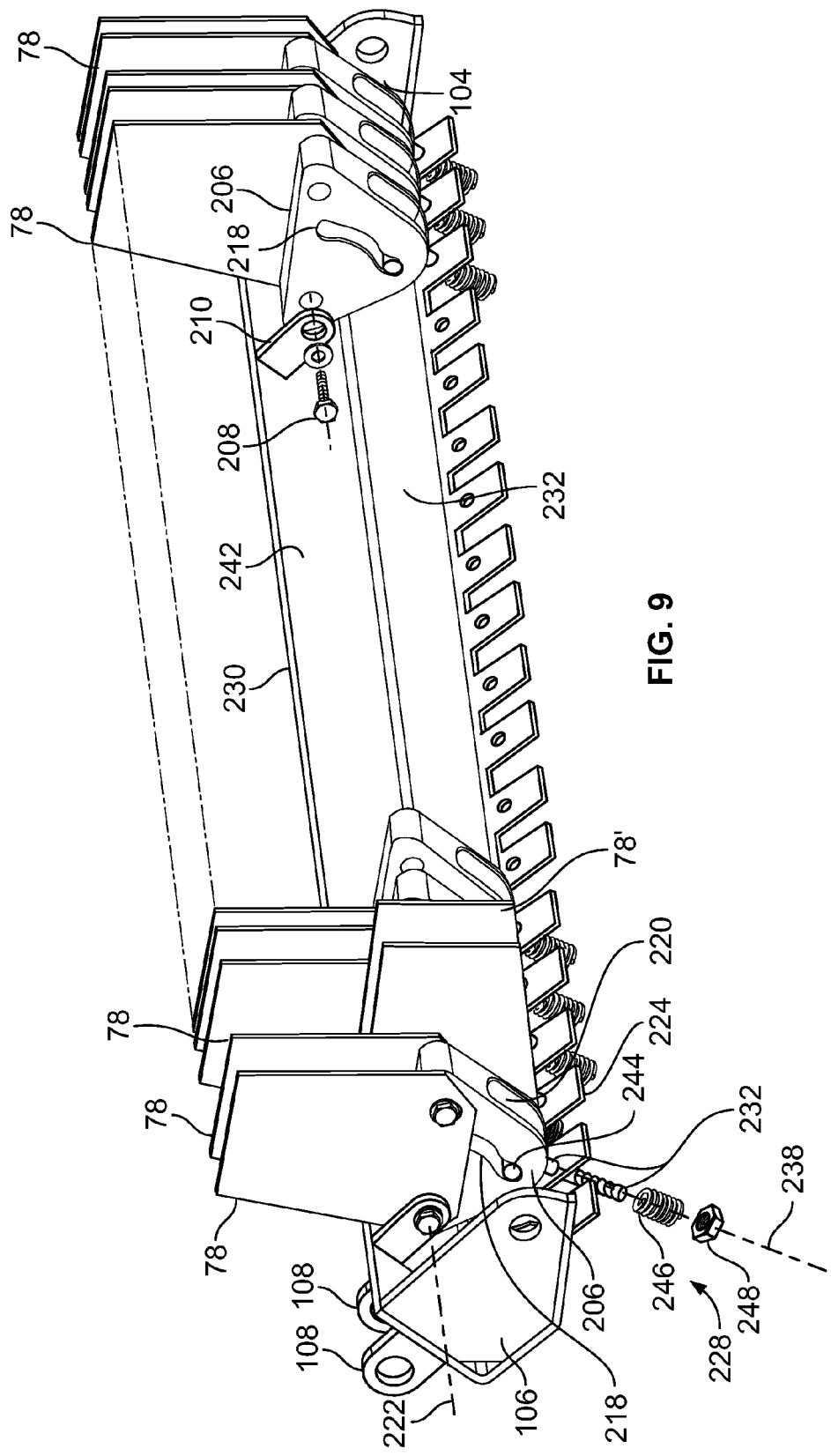
FIG. 9 shows a perspective view of a knife bank assembly with one pair of knife elements rotated.

Each body 206 is attachable, such as by a nut and bolt mounting pair 208 as shown in FIG. 8 to a flanged bracket 210 positioned and secured along the interior side 242 of the extended knife bar 230. As further shown in FIG. 8, bracket 210 includes a pair of aligned openings 212 configured to receive a nut and bolt mounting pair 208. Nut and bolt pair 208 are utilized to mount the knife elements 78 to the bodies 206 and knife bar 230. A first nut and bolt pair 208 is associated with aligned openings 212 of flanged bracket 210 defining an axis 222, mounting holes 234 of a pair of knife elements 78 and an aperture 214 formed in body 206. Nut and bolt pair 208 are to be sufficiently tightened to secure corresponding components together and permit relative movement between other corresponding components according to the present disclosure, yet not over-tightened to prevent movement between components, such as knife elements 78 and body 206 relative to bracket 210. Alternately, instead of nut and bolt pair 208, a pin with an opening at one end to receive a retainer such as a cotter pin or roll pin may be utilized, a shoulder bolt, or other suitable construction. A second nut and bolt pair 208 is associated with mounting holes 235 of the pair of knife elements 78 and aperture 216 of body 206. As a result of the nut and bolt pairs 208 and knife element(s) 78, body 206 is affixed to knife element(s) 78, i.e., knife element(s) 78 will not rotate relative to corresponding bodies 206. Body 206 includes a slot 218 formed through the opposed surfaces of body 206, as well as a slot 220 formed along a portion of the periphery of body 206 such that slot 220 extends into slot 218. Knife bar 230 includes a flange 224 having an opening 226 formed therethrough to receive a resilient device 228. As shown in FIG. 8, resilient device 228 comprises a threaded fastener 232 having an axis 238, fastener 232 including a narrow head 240 configured to be inserted through slot 220 and into slidable engagement with slot 218 of body 206. In one embodiment, head 240 of threaded fastener 232 includes opposed projections 244 extending perpendicular to axis 238 of fastener 232 resembling a trunnion. As further collectively shown in FIGS. 8 and 9, protrusions 244 of head 240 are directed through slot 220 of body 206 and slidably engage respective portions of slot 218 of body 206. The shaft of threaded fastener 232 extends through opening 226 of flange 224 of knife bar 230, then through a resilient element 246 such as a spring and a nut 248, which nut 248 is threadedly engaged onto threaded fastener 232, securing resilient element 246 between flange 224 and nut 248.

When the knife bank 76 is mounted and the various other components of the chopper grate assembly 48 so assembled and configured as depicted in FIG. 3, with the knife elements 78 of the knife bank 76 projecting through slots 68 of grate portion 66, crop residue can be transported through passageway 70 as the knife blades 62 of the rotary member 61 rotate past the knife elements 78 of knife bank 76 in the interengagable fashion as depicted in FIG. 6. If a rock or other foreign object impacts one or more given knife elements 78 of knife bank 76 with sufficient force to overcome a retention force between body 206 and resilient device 228 by virtue of a sliding contact or engagement between resilient device 228 and slot 218 of body 206, as will be discussed in additional detail below, mounting hole 234 of such knife element 78 may rotate about axis 222 formed by the nut and bolt pair 208 associated with openings 212 of bracket 210, as is shown collectively in FIGS. 8-11 wherein knife elements 78' (FIGS. 9 and 11) are shown rotated to at least partially displaced or relaxed or retracted positions. However, subsequent to the foreign object impact, knife elements 78 are urged toward its previous operating position by virtue of the retention force between body 206 and resilient device 228.

Figure 10:
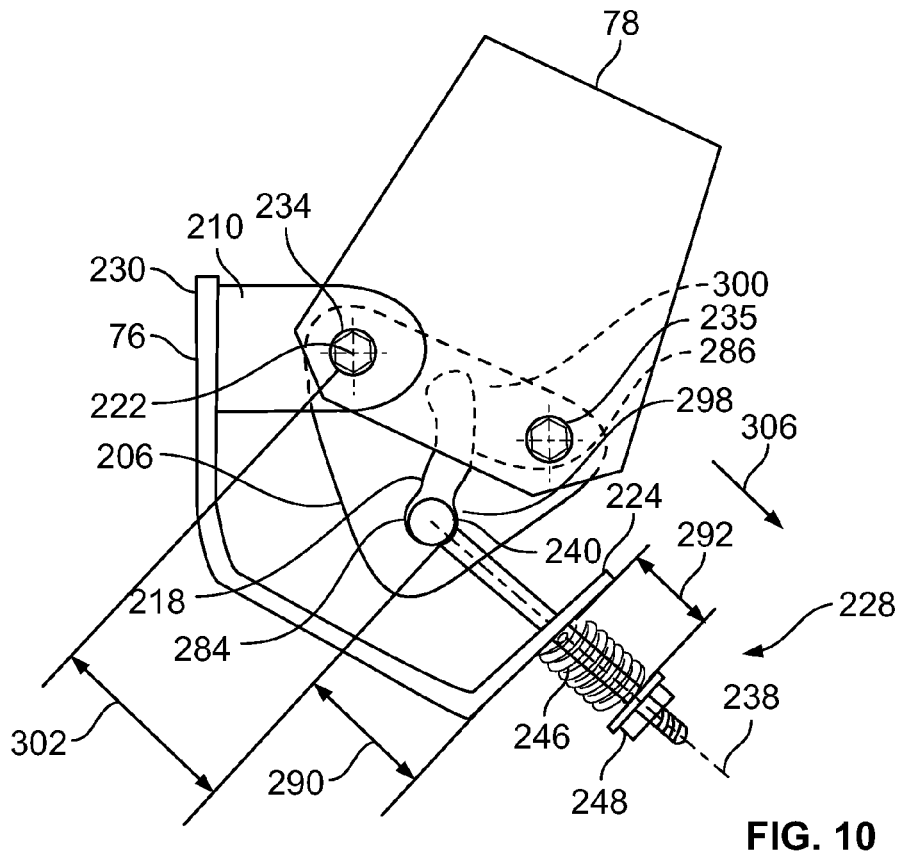
FIG. 10 shows a side view of the knife bank assembly of FIG. 9 with one pair of knife elements in a non-rotated position.

FIG. 10 shows a knife element 78 of knife bank 76 in a fully operational position, such as also shown in FIG. 4, in which knife element 78 is fully extended into passageway 70. In the fully extended position of knife element 78, head 240 of threaded fastener 232 of resilient device 228 is positioned in a first portion 284 of slot 218 of body 206, first portion 284 having an axis 288. In the fully extended or fully operational position of knife element 78 as shown in FIG. 10, axis 238 of threaded fastener 232 of resilient device 228 forms an acute angle with axis 288 of first portion 284. In one embodiment, first portion 284 defines a detent. In the fully operational position of knife element 78, a distance 302 separates axis 222 from the point of contact of first portion 284 of slot 218 and head 240 of threaded fastener 232 of resilient device 228. Similarly, a distance 290 separates the point of contact of first portion 284 and head 240 and flange 224 of knife bar 230. Further, a distance 292 separates flange 224 and nut 248 that compresses resilient element 246. By virtue of the orientation of axis 288 of first portion 284 of slot 218 relative to axis 222, as well as the orientation of axis 238 of resilient device 228 and the pre-load of resilient element 246 of resilient device 228 associated with distance 292, the magnitude of force required to urge rotational movement of knife element 78 from the fully operational position is substantially greater than forces associated with normal operation of knife bank 76. That is, due to the orientation of first portion 284 of slot 218 in combination with retention forces associated with resilient device 228, knife element 78 will remain in the fully operational position during normal operation of knife bank 76.

Stated another way, knife bank 76 is operably connected to the chopper grate assembly 48 (FIG. 3), the knife bank 76 being movable between a first position or fully operational position where knife elements 78 of the knife bank 76 are fully inserted into the passageway 70 and a second position where knife elements 78 of the knife bank 76 are fully retracted from the passageway 70. Body 206 has a slot 218 formed therein, the body 206 secured to the knife bank 76 and at least one knife element 78. The body 206 and the knife element 78 are configured to rotate about axis 222 relative to the knife bank 76. Resilient device 228 is operably connected to the slot 218 and the knife bank 76. The resilient device 228 prevents rotation of the knife element 78 about the axis 222 away from the first position or fully operational position and toward the second position or retracted position until the knife element 78 is subjected to a predetermined force. Upon removal of the predetermined force, the resilient device 228 urges the knife element 78 to rotate about the axis 222 toward the first or fully extended or fully operational position. That is, resilient device 228 urges knife element 78 to rotate about axis 222 from a retracted position toward the first or fully extended or fully operational position relative to knife bank 76. Resilient device 228 is independent of the actuating device previously discussed (FIG. 4) that actuates knife bank 76 to control the position of knife elements 78.

Figure 11:
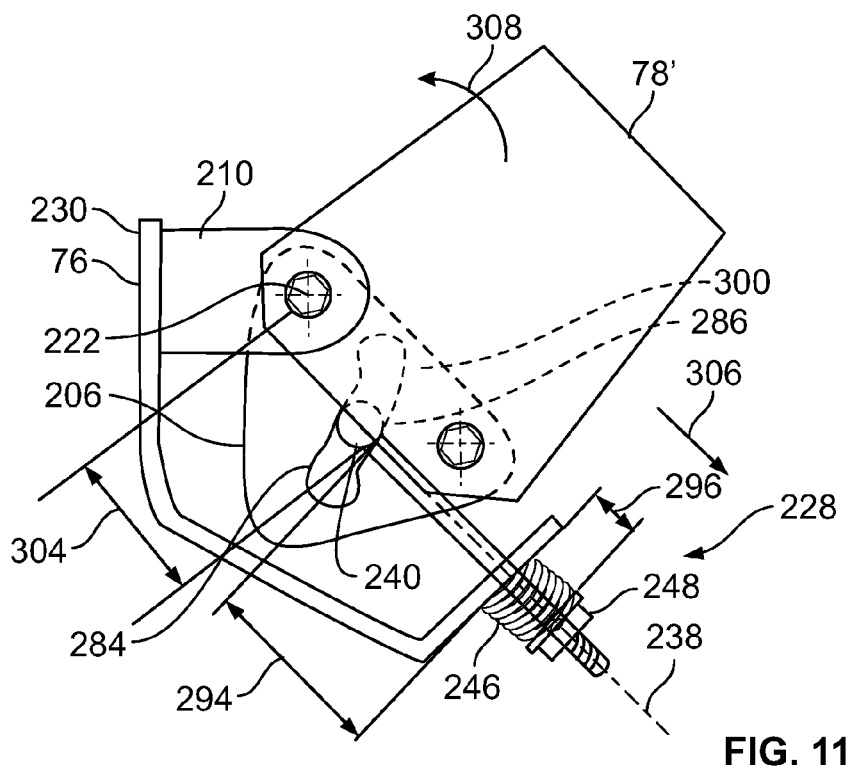
FIG. 11 shows a side view of the knife bank assembly of FIG. 9 with one pair of knife elements in a partially rotated position.

FIG. 11 shows a knife element 78 of knife bank 76 subsequent to knife element 78 impacting a foreign object with a force sufficient to overcome retention forces between first portion 284 of slot 218 and resilient device 228 as previously discussed. As a result of the impact, blade element 78 has been urged to rotate about axis 222 such that head 240 of threaded fastener 232 of resilient device 228 is located along second portion of slot 218 of body 206, i.e., to a position that is at least partially retracted from the fully operational or fully extended position or between opposed ends 298, 300 of second portion 286 of slot 218. End 298 of second portion 286 of slot 218 is proximate to first portion 284 of slot 218, while end 300 of second portion 286 of slot 218 is distal from first portion 284 of slot 218. In the partially retracted position of knife element 78, head 240 of threaded fastener 232 of resilient device 228 is positioned in second portion 286 of slot 218 of body 206. In the at least partially retracted position of knife element 78' as shown in FIG. 11, a distance 304 separates axis 222 from the point of contact of second portion 286 of slot 218 and head 240 of threaded fastener 232 of resilient device 228. Distance 304 is less than distance 302 of FIG. 10. In addition, a distance 294 separates the point of contact of second portion 286 and head 240 and flange 224 of knife bar 230. Distance 294 is greater than distance 290 of FIG. 10. Further, a distance 296 separates flange 224 and nut 248 that compresses resilient element 246. Distance 296 is less than distance 292 in FIG. 10. As shown in FIG. 11, second portion 286 is shaped such that as the point of contact between head 240 with second portion 286 of slot 218 is moved further away from first portion 284, the distance between axis 222 and the point of contact between head 240 and second portion 286 is decreased. Conversely, as the point of contact between head 240 and second portion 286 of slot 218 is moved further away from first portion 284, distance 294 is increased. In addition, as the point of contact between head 240 a second portion 286 of slot 218 is moved further away from first portion 284, distance 296 associated with compression of resilient element 246 is decreased. As a result, a retention force 306 exerted by resilient element 246 of resilient device 228 along axis 238 increases, knife element 78' is urged in rotational movement direction 308 from the partially retracted position toward the fully operational position.

Figure 12:
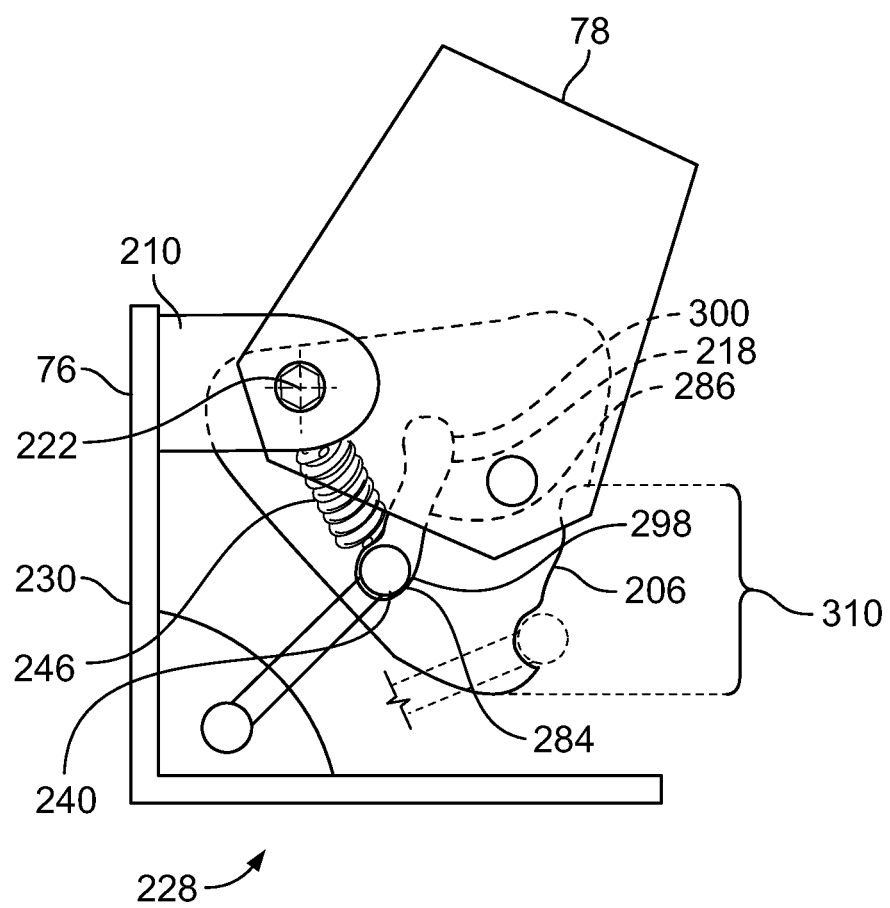
FIG. 12 shows a side view of an exemplary embodiment of the knife bank assembly with one pair of knife elements in a non-rotated position.

FIG. 12 shows an exemplary embodiment of an arrangement of body 206 associated with knife element(s) 78 of knife bank 76 in which resilient element 246 of resilient device 228 is further compressed or shortened as the point of contact between head 240 of resilient device 228 is moved away from first portion 284 toward second portion of slot 218. It is appreciated by those having skill in the art that in other arrangements, the distance between rotational axis 222 and first end 298 of second portion 286 can be greater than the distance between rotational axis 222 and second end 300 of second portion 286, so long as a retention force by a resilient element urges blade element 78 to rotate about a rotational axis to return the blade element from a retracted position to an extended or fully operational position, as previously discussed.

It is to be understood that resilient devices, such as springs can include compression, extension, non-linear springs or other suitable constructions configured to control the positioning of the blade elements in a manner previously discussed.

Figure 13:
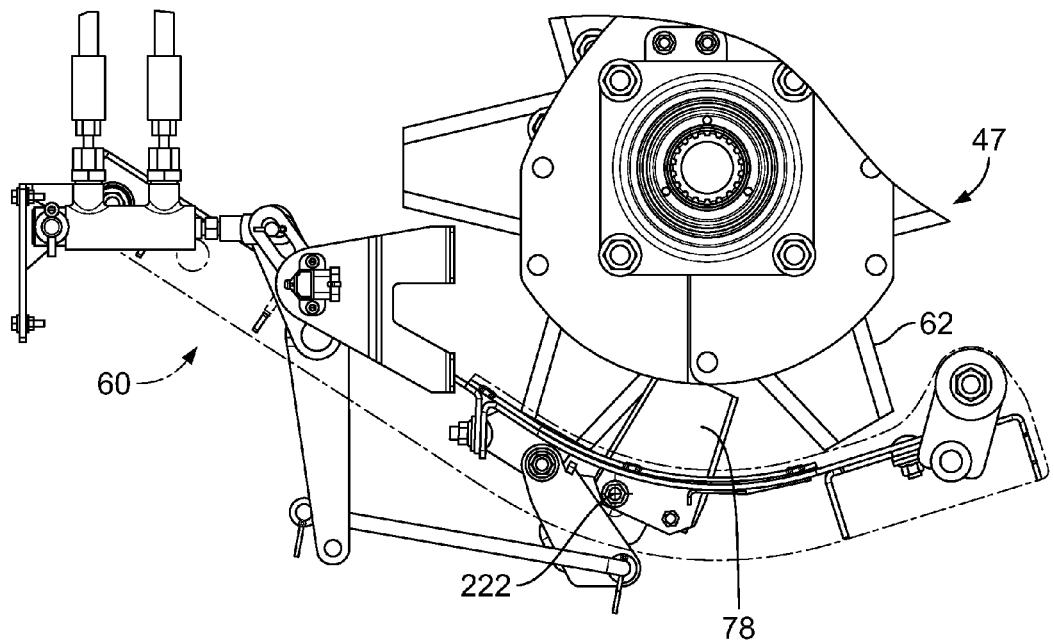
FIGS. 13-15 show, in simplified left side views, different positions for the knife blades of the counter knife assembly.
Figure 14:
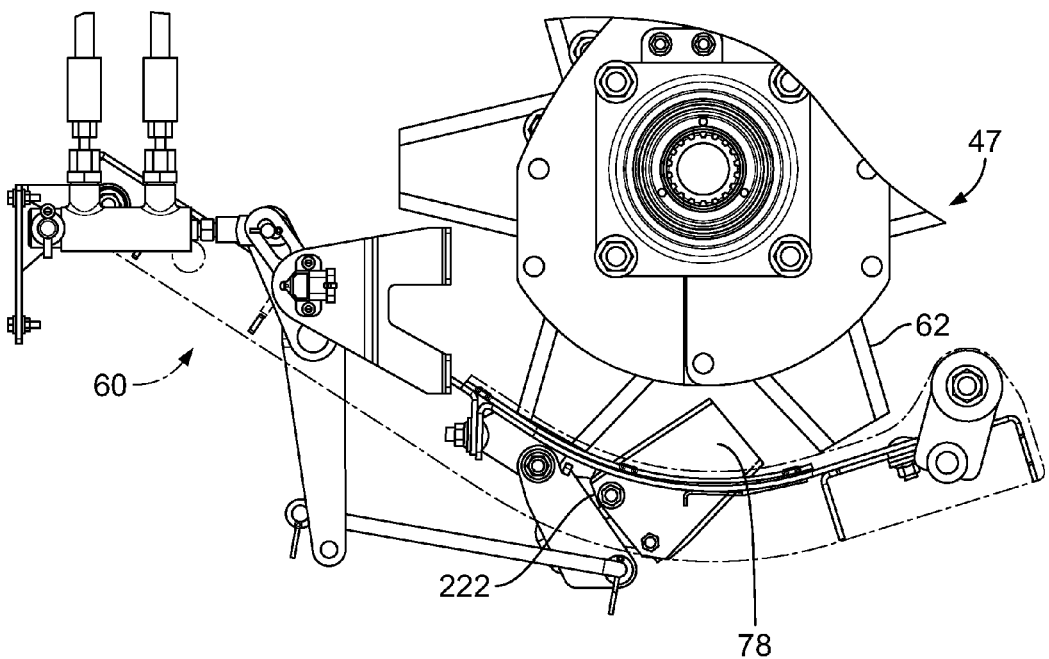
Figure 15:
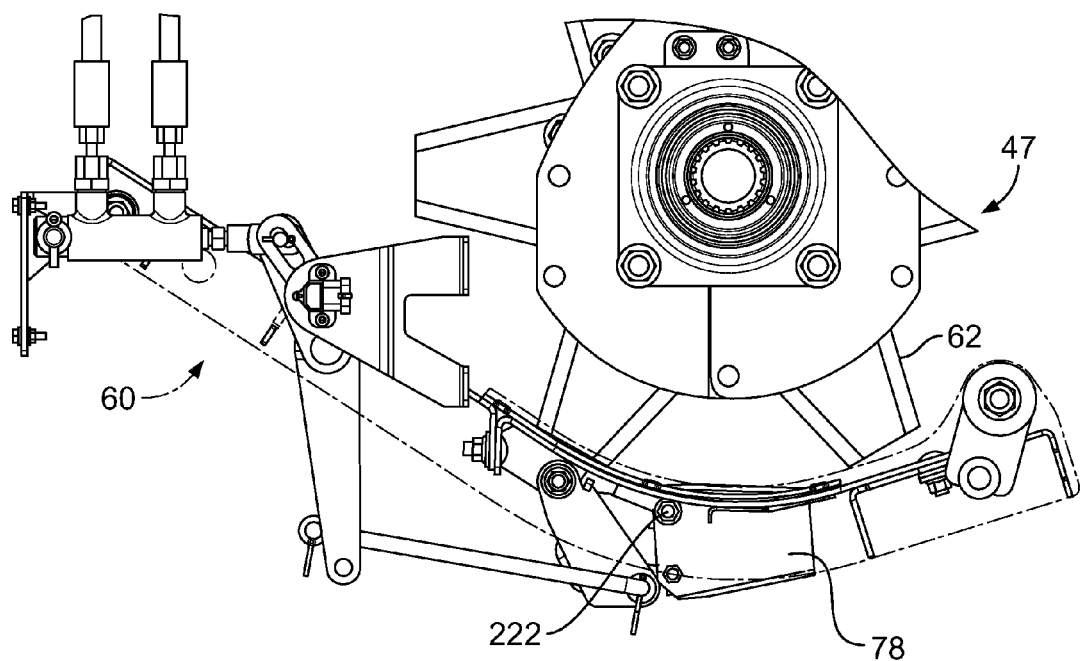

FIGS. 13-15 show different positions for the knife blades elements 78 of the counter knife assembly 60. FIG. 15 shows the counter knife assembly 60 and knife blade elements 78 in a completely refracted position or at a zero degree (0°) insertion position. When the counter knife assembly 60 is in the refracted position, the knife blade elements 78 are positioned out of the flow path of the crop residue and do not provide any additional chopping of the crop residue travelling through the chopper assembly 46. FIG. 14 shows the counter knife assembly 60 and knife blade elements 78 in a fifty percent (50%) inserted position or at a twenty four degree (24°) insertion position. When the counter knife assembly 60 is in the 50% position, the knife blade elements 78 are partially positioned in of the flow path of the crop residue and can provide some additional chopping of the crop residue travelling through the chopper assembly 46. FIG. 13 shows the counter knife assembly 60 and knife blade elements 78 in a fully inserted position or at a forty eight degree (48°) insertion position. When the counter knife assembly 60 is in the fully inserted position, the knife blade elements 78 are positioned in the flow path of the crop residue and provide the most additional chopping of the crop residue travelling through the chopper assembly 46.

In one exemplary embodiment, the amount of rotation of knife elements of the knife bank assembly 76 determines the amount of insertion of the knife blades. In the exemplary embodiment shown in FIGS. 13-15, the knife elements of knife bank assembly 76 are rotated 48 degrees to travel from the completely inserted position to the fully retracted position. In other exemplary embodiments, the amount of rotation or degrees of rotation required to have the knife bank assembly 76 travel from the completely retracted position to the fully inserted position can be in the range of about 20° to about 70°.

Although the foregoing discussions have been presented with particular reference to a body or holder having a slot formed therein, the present disclosure is further intended to include body constructions in which the body or holder has a profile formed thereupon that is operably connected to a resilient device in a manner similar to that previously discussed. That is, instead of, or in addition to the body having a slot, the body can include a profile or portion of a peripheral surface of the body that resembles the shape and/or contour of the slot which is configured to be operatively connected to and interact with the resilient device in a manner similar to that previously discussed. For example, as shown in FIG. 12, profile 310 resembles the portion of the surface of slot 218 that is adjacent to axis 222, and which would interact with head 240 of resilient device 228.

Although the foregoing discussions have been presented with particular reference to a body or holder and knife element(s) configured to rotate about an axis relative to the knife bank, the present disclosure is further intended to include arrangements in which the body or holder and knife element(s) are configured to move linearly or non-linearly, i.e., non-rotatably, relative to the knife bank, utilizing a slot arrangement and a resilient device as previously discussed.

Although the foregoing discussions have been presented with particular reference to integral chopper assemblies, it should be understood and appreciated that the present application is not intended to be and should not be considered to be limited to use or practice in or with integral chopper systems. It should be recognized that the present application may well also find application and be advantageously employed and practiced in various other types of chopper systems, including, by way of example only and not of limitation, hood mount chopper systems. Accordingly, references in the claims which follow to chopper assemblies or chopper systems are intended to be broadly treated and not limited to integral chopper assemblies or systems.

In the further consideration of the drawings of this application and the discussion of such drawings and the elements shown therein, it should also be understood and appreciated that, for purposes of clarity in various of such drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already by widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A chopper assembly for harvesting equipment comprising:
   a rotary chopper element;
   a chopper grate assembly spaced from the rotary chopper element to form a passageway for crop residue;
   a knife bank operably connected to the chopper grate assembly, the knife bank being movable between a first position where knife elements of the knife bank are fully inserted into the passageway and a second position where knife elements of the knife bank are fully retracted from the passageway;
   a body having a slot formed therein or profile formed thereupon, the body secured to the knife bank and at least one knife element, the body and the knife element configured to move relative to the knife bank; wherein blades associated with the at least one knife element remain contact-free from a linkage mechanism that facilitates a movement of the knife element relative to the knife bank; and
   a resilient device coupled to the slot or profile and the knife bank, the resilient device preventing movement of the knife element away from the first position and toward the second position until the knife element is subjected to a predetermined force, upon removal of the predetermined force, the resilient device urging the knife element to move toward the first position; and
   wherein the body and the knife element are configured to rotate about an axis relative to the knife bank, the resilient device preventing rotation of the knife element about the axis away from the first position and toward the second position until the knife element is subjected to a predetermined force, upon removal of the predetermined force, the resilient device urging the knife element to rotate about the axis toward the first position.

2. The chopper assembly of claim 1, further comprising an actuating mechanism to move the knife element between the first position and the second position independent of the resilient device and the body.

3. The chopper assembly of claim 1, wherein the resilient device includes a spring.

4. The chopper assembly of claim 3, wherein the spring is selected from the group consisting of compression, extension, and non-linear constructions.

5. The chopper assembly of claim 1, wherein the body is secured to a plurality of knife elements of the knife bank.

6. The chopper assembly of claim 1, wherein the body is secured to the knife element.

7. A chopper assembly for harvesting equipment comprising:
- a rotary chopper element;
- a chopper grate assembly spaced from the rotary chopper element to form a passageway for crop residue;
- a knife bank operably connected to the chopper orate assembly, the knife bank being movable between a first position where knife elements of the knife bank are fully inserted into the passageway and a second position where knife elements of the knife bank are fully retracted from the passageway;
- a body having a slot formed therein or profile formed thereupon, the body secured to the knife bank and at least one knife element, the body and the knife element configured to move relative to the knife bank; wherein blades associated with the at least one knife element remain free from contacting a linkage mechanism that facilitates a movement of the knife element relative to the knife bank; and
- a resilient device operably connected to the slot or profile and the knife bank, the resilient device preventing movement of the knife element away from the first position and toward the second position until the knife element is subjected to a predetermined force, upon removal of the predetermined force, the resilient device urging the knife element to move toward the first position; and
- wherein the slot or profile having a first portion extending to a second portion having a first end proximate to the first portion and a second end distal of the first portion,
- the first portion subtending an acute angle between an axis of the resilient device when the resilient device is in the first position,
- the first end of the second portion is positioned at a first distance from the rotational axis of the knife,
- the second end of the second portion is positioned at a second distance from the rotational axis of the knife,
- wherein proceeding along the slot or profile from the first end of the second portion toward the second end of the second portion, a deviation from the first distance increases.

8. The chopper assembly of claim 7, wherein the first distance is greater than the second distance.

9. The chopper assembly of claim 7, wherein the first distance is less than the second distance.

10. The chopper assembly of claim 7, wherein the first portion is a detent.

11. A chopper assembly for harvesting equipment comprising:
- a rotary chopper element;
- a chopper grate assembly spaced from the rotary chopper element to form a passageway for crop residue;
- a knife bank operably connected to the chopper grate assembly, the knife bank being movable between a first position where knife elements of the knife bank are fully inserted into the passageway and a second position where knife elements of the knife bank are fully retracted from the passageway;
- a body having a slot formed therein or profile formed thereupon, the body secured to the knife bank and at least one knife element, the body and the knife element configured to rotate about an axis relative to the knife bank, wherein blades associated with the at least one knife element remain contact-free from a linkage mechansim that facilitates rotation of the knife element relative to the knife bank; the slot or profile comprising;
- a first portion extending to a second portion having a first end proximate to the first portion and a second end distal to the first portion,
- the first portion subtending an acute angle between an axis of the resilient device when the resilient device is in the first position,
- the first end of the second portion is positioned at a first distance from the rotational axis of the knife,
- the second end of the second portion is positioned at a second distance from the rotational axis of the knife, and
- upon proceeding along the slot or profile from the first end of the second portion toward the second end of the second portion, a deviation from the first distance increases; and
- a resilient device operably connected to the slot or profile and the knife bank, the resilient device preventing rotation of the knife element about the axis away from the first position and toward the second position until the knife element is subjected to a predetermined force, upon removal of the predetermined force, the resilient device urging the knife element to rotate about the axis toward the first position; and
- an actuating mechanism to move knife elements of the knife bank between the first position and the second position independent of the resilient device and the body.

12. The chopper assembly of claim 11, wherein the first distance is greater than the second distance.

13. The chopper assembly of claim 11, wherein the first distance is less than the second distance.

14. The chopper assembly of claim 11, wherein the first portion is a detent.

15. The chopper assembly of claim 11, wherein the resilient device includes a spring.

16. The chopper assembly of claim 11, wherein the spring is selected from the group consisting of compression, extension, non-linear constructions.

17. The chopper assembly of claim 11, wherein the body is secured to a plurality of knife elements of the knife bank.

18. The chopper assembly of claim 11, wherein the body is secured to the knife element of the knife bank.

* * * * *